Patented Apr. 6, 1948

2,439,202

UNITED STATES PATENT OFFICE 2,439,202

COMPOSITION OF BUTADIENE-ACRYLONITRILE COPOLYMER AND STYRENE-ACRYLONITRILE COPOLYMER

Lawrence E. Daly, Mishawaka, Ind., assignor to United States Rubber Company, New York, N. Y., a corporation of New Jersey No Drawing. Application October 19, 1946, Serial No. 704,541

4 Claims. (Cl. 260—45.5)

This invention relates to thermoplastic molding compositions, and more especially to thermoplastic compositions comprising, in combination, a relatively soft, elastic (i. e., normally extensible and self-retractible to substantially original size and shape) synthetic rubber and certain thermoplastic synthetic resins which are hard and inelastic, that is, non-elastic (non-rubbery) polymers at ordinary temperatures. The final products range in flexibility from those resembling soft leather to very tough, hard, yet resilient, molding compositions, according to the resin to synthetic rubber ratio.

An object of the invention is to produce a hard, resilient, tough thermoplastic molding composition. Another object is to produce a hard, tough thermoplastic molding composition which will not soften or deform in boiling water (212° F.). Another object is to produce a leather substitute from a synthetic rubber-resin mixture. A primary object is to provide, for the purposes of the invention, synthetic resins which will be compatible, i. e., capable of being mixed homogeneously and inseparably at 275–400° F., with the synthetic rubbers, that is, 1,3-butadiene-derived elastic synthetic rubbers, especially those of the Buna S and Buna N types, and resins which will satisfactorily fulfill the aforesaid objects. The Buna N, i. e., 1,3-butadiene-acrylonitrile copolymer type rubber, is disclosed in U. S. Patent No. 1,937,000, and is a well-known article of commerce. Other objects will be apparent from the hereinafter disclosure.

The invention is particularly concerned with a thermoplastic composition composed essentially of a blend, that is, a homogeneous mixture of a normally rubbery copolymer of butadiene-1,3 and a compound of the formula $CH_2=CH-X$ where X is phenyl or CN, with a hard, thermoplastic styrene-acrylonitrile resinous copolymer which is non-rubbery at room temperatures, and which may even be brittle at room temperatures.

The elastic synthetic rubber component of the mixture has an ultimate elongation of at least 150%; the relatively inelastic hard resin component has an elongation of less than 5%. The Buna N type rubber is preferred to the Buna S (GRS butadiene-styrene copolymer) type of synthetic rubber because the inelastic copolymer resin mixes more readily with the former than with the Buna S (GRS) type rubber.

The normally hard thermoplastic resinous styrene-acrylonitrile copolymer may be arranged by the emulsion polymerization procedure, disclosed in U. S. Patent No. 2,140,048, using a large amount of the monomeric styrene, e. g., 50–85% by weight of the styrene, in the binary mix of monomers, the proportion of the monomeric acrylonitrile being correspondingly from 50 to 15% by weight. In this manner normally hard resinous copolymers, which are non-rubbery at room temperatures, are obtainable with corresponding softening points ranging from about 90° C. to about 108° C. (195° F. to about 226° F.). Increase in the proportion of acrylonitrile gives an increase in the softening temperature of the copolymer resin, which in turn provides for a final composite thermoplastic which is more resistant to deformation at higher temperatures. other methods such as en masse copolymerization may also be used.

In more detail, the thermoplastic hard normally inelastic synthetic resin may be prepared by the emulsion polymerization of styrene and of acrylonitrile as disclosed in U. S. Patent No. 2,140,048, in the presence of an emulsifying agent and a polymerization catalyst. The customary regulators or modifiers used in making GRA (Buna N) may be included, such as those of the mercaptan or other type. A convenient recipe is:

| | Parts by weight |
|---|---|
| Water | 180–400 |
| Peroxidic catalyst | 0.1–1.5 |
| Styrene | 85–50 |
| Acrylonitrile | 15–50 |
| Emulsifying agent | 0.5–150 |
| Modifier | 0–1 |

After the autoclave, which is equipped with a stirrer, is charged with the mixture it is heated with stirring until there has been a 90% or better conversion to the desired copolymer resin. Time and temperature are co-related. The temperatures may range from 80° F. to as high as 200° F.; at 95° F., about 10–14 hours are needed.

The coagulation may be carried out, with stirring, in any of the conventional ways, by acid (e. g., acetic acid), or salt solution, at room temperaure or higher; coagulation by heat may also be employed. The coagulate is separated by filtration or otherwise, washed with water and dried to produce a friable powder. The material may also be prepared in resin powder form by spray-drying the synthetic latex. The solid resin at room temperatures, such as 20° C., is lacking in elastic (rubber-like) properties; it can be milled into a sheet which is hard, tough and brittle at ordinary room temperatures. It has a softening temperature of about 195° F. to about 226° F., varying within these limits according to the varlation in the proportion of the starting materials and the degree to which the polymerization is controlled. The white solid or powder is capable of being milled or molded to a hard tough product, softening at from 10 to 25° C. higher than pure polystyrene which has a softening point of about 80° C.

The hard thermoplastic resin component is mixed with the synthetic rubber on a rubber mill, Banbury mixer, or other suitable mixing apparatus, in proportions by weight ranging from 25 to 90% of the resin-rubber composition. As the amount of the hard resin is increased, the hardness, toughness, and tensile strength of the resultant composition increases. The mixes containing in the range of 25 to 50% by weight of the hard resin, result in tough, flexible, leather-like materials which are specially strong and highly resistant to abrasion or scuffing, and show from 100–500% better than genuine leather on wear tests.

When the hard resin content is increased to a proportion above 50%, and up to 90%, preferably about 65–75%, of the resin-rubber mix, molding compositions result which can be shaped or formed to any desired contour under heat and pressure. The products are hard, tough, and horny, in contrast to the leather-like compositions containing less than 50% of the hard resin; they also have high impact resistance.

The following examples are given to illustrate the invention, the parts being by weight:

Example 1

65 parts by weight of a styrene-acrylonitrile copolymer, derived from a monomeric mix consisting of 30% acrylonitrile and 70% styrene, and which copolymer has a softening point of about 200° F., is banded on a rubber mill. The mill rolls are heated and maintained at a temperature of 300° F.–400° F., until the resin becomes plastic. 34 parts of Buna N type synthetic rubber are then added. Mixing is continued for about 20 minutes, whereupon a homogeneous mixture is obtained. The mixing may also desirably be done in a Banbury mixer at a slightly lower temperature, e. g., 300–350° F., because the mixture in the Banbury is not exposed to the air as it is on an open mill.

The material is then calendered in sheets (one or more plies, and separators therefor, if desired) of the desired thickness and pressed smooth between the platens of a hydraulic press, or otherwise, at pressures in the range of 200–1000 pounds per square inch, and at a temperature of from 300–335° F. The platens of the press are cooled to bring the temperatures of the composition down to about 150° F.–180° F., whereupon it is removed from the press. Instead of molding in a platen press as just described, the calendered sheets may be tiered and heated, in a chamber, with live steam, and then cooled.

The resulting sheet is very hard and boardy at room temperature (68° F.). It has a tensile strength of approximately 4600 pounds per square inch and an elongation of from about 30% to about 75%. The elongation is variable according to the degree to which the composition has been stretched during the calendering and pressing operations. The impact strength per inch of Izod notch is 2 to 3 foot pounds compared to 0.2 to 0.6 for molded parts from other plastics, such as polystyrene, polymethyl methacrylate, hard vinyl chloride-acetate copolymers, nylon, etc. It has a hardness, Shore type D durometer, of 80. It has a compressive yield stress of 5600 pounds per square inch and a flexural strength of about 7000 pounds per square inch. The abrasion resistance when measured on a Taber abrader, using CS-10 Calebrase wheels under 1000 pounds pressure, showed 5 mg. of material were ground from the surface per 1000 revolutions. The distortion temperature of this composition is approximately 200° F.

The composition can be remolded over and over again by the application of heat without adversely affecting the product. The material also has the peculiar property of elastic memory, i. e., upon reheating a molded shape above its softening temperature, it will revert to the shape from which it was originally formed. It also has a low (less than .2%) moisture absorption.

Molded shapes may be obtained by heating flat pressed sheets of the material, drawing or stamping them into the desired shape, and then cooling while confined to the shape of the mold. The thermoplastic sheets may also be molded by laying them over a form, creating a vacuum therebetween to pull the sheet down tightly to the form, and cooling to below the softening point of the sheet.

The composite thermoplastic is resistant to acids, caustic, water, water vapor, aliphatic hydrocarbons, alcohols, and organic esters.

The compositions containing a major proportion, that is, more than 50% by weight of the inelastic resin in the resin-rubber mix, are readily molded to various shapes and are particularly suitable for applications where great resistance to deformation under sudden impact is required, for example, automobile fenders, protective helmets, golf club heads, golf ball covers, etc.

The addition of sulfur (usually ½ to 5 parts by weight based on each 100 parts of the total rubber-resin mix), or other suitable curing agent, sufficient to cure the rubber component to a soft vulcanized state, if cured alone, will raise the softening point of the composite thermoplastic, for example, about 10° F. The addition of a vulcanizing agent is desirable where a low softening point styrene-acrylonitrile copolymer resin, for example, one softening at approximately 195° F., is used, in order to improve the deformation resistance of the cured product. Another way of raising the softening point of the plastic composition is by incorporating a thermoplastic resin-like polydichlorostyrene, e. g., one having a softening point of 212° F.–230° F. for part of, that is, up to 50% by weight of the aforesaid inelastic resin, the total resin proportionation to the rubber being within the limits set forth above. Besides raising the distortion temperature, the polydichlorostyrene improves the resistance of the final product to moisture.

The following composition, processed as above, is useful for molding cafeteria trays, cups, and hard rubber-like implements which require sterilization in boiling water.

Example 2

| | Parts by weight |
|---|---|
| Polydichlorostyrene | 40 |
| Styrene-acrylonitrile copolymer resin (70:30) | 40 |
| 1,3-butadiene-acrylonitrile (Buna N) | 20 |

This composition gives a hardness, Shore D durometer of about 78.

A great variety of colors may be obtained by adding pigments to the composition. The hard molded products also show high resistance to ageing, showing no crazing or cracking after many weeks of exposure in the weatherometer.

The products may also find useful application in the electrical field, e. g., screw driver handles, insulators for contact plugs, electrical instrument mounting panels, telephone switchboard panels, contact separator blocks for telephone switchboard panels, etc.

If it is desired to improve the oil or ozone resistance, a small proportion, for example, up to 10% of the aforesaid elastic rubber component may be replaced with elastomers like neoprene (polychloroprene), or by Butyl rubber (a rubbery copolymer of a major proportion of an aliphatic isoolefine such as isobutylene with a conjugated diolefine such as butadiene-1,3 or isoprene).

*Example 3*

An example of an excellent leather substitute which may be made according to this invention comprises:

| | Parts by weight |
|---|---|
| Styrene-acrylonitrile copolymer resin (contains 15 to 30% of acrylonitrile) (softening range 195–226° F.) | 25 |
| Buna N elastic synthetic rubber | 75 |
| Zinc oxide | 5 |
| Benzothiazyl disulfide (accelerator) | 1 |
| Stearic acid | 2 |
| Sulfur | 1.5 |

This composition is processed on the mill and in the hydraulic press in the same manner as Example 1, the sulfur being added last, after the mill roll temperatures have been lowered to bring the stock temperature below 200° F. It is calendered into sheets and then pressed between the platens of a hydraulic press and cured to produce a smooth leather-like sheet. (Whether or not all the sulfur combines with the rubber component, sufficient is incorporated in proportion to the rubber to cure it to a soft vulcanized state, if it were cured alone.) The sheet is flexible, comparable to upholstery leather, and may be used in a variety of applications, including luggage, upholstery, and handbags, etc. The composition may be embossed with a leather grain by pressing the calendered sheet against a mold embossed with the desired grain finish. The operation is carried out under a pressure of 60 to 70 pounds per square inch at 300° F. The flexing and abrasion properties of this compound compared to another where the resin and rubber components are mixed in equal parts, and as against a commercial leather substitute are shown in the following table, the test sample being 1 inch wide and .075 inch thick:

| Flexing Data | Description of Crack | | Taber Abrasion Data [1] | |
|---|---|---|---|---|
| | Depth | Width | Wear (degree) | Rev. |
| | *Per cent* | *Per cent* | *Per cent* | |
| Resin-rubber mix (25:75) | 10 | 100 | 20 | 5,000 |
| Resin-rubber mix (50:50) | 100 | 40 | ([2]) | 10,000 |
| Polyvinyl resin leather substitute | 100 | 10 | 15 | 5,000 |
| Leather | | | 100 | 5,000 |

[1] Test made under sandpaper wheel with all conditions identical.
[2] Not noticeable.

The composition does not harden up even upon prolonged exposure to above normal temperatures as do most plastic artificial leather substitutes which contain volatile plasticizer.

The material which contains equal parts of the inelastic resin and rubber resembles sole leather in properties and is many times superior to filled sole leather with respect to wear resistance.

Having thus described my invention, what I claim and desire to protect by Letters Patent is:

1. A composite thermoplastic homogeneous mixture of a normally elastic rubbery copolymer of butadiene-1,3 and acrylonitrile and a hard normally inelastic resinous thermoplastic copolymer of monomers consisting essentially of from 50 to 85% by weight of styrene and correspondingly from 50 to 15% by weight of acrylonitrile, said copolymers being present in proportions of from 25 to 90% by weight of said resinous copolymer and correspondingly from 75 to 10% by weight of said rubbery copolymer, said last-named percentages being by weight based on the sum of the weights of said resinous and rubbery copolymers.

2. A composite thermoplastic homogeneous mixture of a normally elastic rubbery copolymer of butadiene-1,3 and acrylonitrile and a hard normally inelastic resinous thermoplastic copolymer of monomers consisting essentially of from 50 to 85% by weight of styrene and correspondingly from 50 to 15% by weight of acrylonitrile, said copolymers being present in proportions of from 25 to 50% by weight of said resinous copolymer and correspondingly from 75 to 50% by weight of said rubbery copolymer, said last-named percentages being by weight based on the sum of the weights of said resinous and rubbery copolymers.

3. A composite thermoplastic homogeneous mixture of a normally elastic rubbery copolymer of butadiene-1,3 and acrylonitrile and a hard normally inelastic resinous thermoplastic copolymer of monomers consisting essentially of from 50 to 85% by weight of styrene and correspondingly from 50 to 15% by weight of acrylonitrile, said copolymers being present in proportions of from more than 50 up to 90% by weight of said resinous copolymer and correspondingly from less than 50 down to 10% by weight of said rubbery copolymer, said last-named percentages being by weight based on the sum of the weights of said resinous and rubbery copolymers.

4. A sulfur-vulcanized composite thermoplastic homogeneous mixture of a normally elastic rubbery copolymer of butadiene-1,3 and acrylonitrile and a hard normally inelastic resinous thermoplastic copolymer of monomers consisting essentially of from 50 to 85% by weight of styrene and correspondingly from 50 to 15% by weight of acrylonitrile, said copolymers being present in proportions of from 25 to 90% by weight of said resinous copolymer and correspondingly from 75 to 10% by weight of said rubbery copolymer, said last-named percentages being by weight based on the sum of the weights of said resinous and rubbery copolymers.

LAWRENCE E. DALY.

REFERENCES CITED

The following references are of record in the file of this patent:

UNITED STATES PATENTS

| Number | Name | Date |
|---|---|---|
| 2,140,048 | Fikentscher et al. | Dec. 13, 1938 |

Certificate of Correction

Patent No. 2,439,202.                                                                April 6, 1948.

LAWRENCE E. DALY

It is hereby certified that error appears in the printed specification of the above numbered patent requiring correction as follows: Column 1, line 53, for the word "arranged" read *prepared*; and that the said Letters Patent should be read with this correction therein that the same may conform to the record of the case in the Patent Office.

Signed and sealed this 29th day of June, A. D. 1948.

[SEAL]

THOMAS F. MURPHY,
*Assistant Commissioner of Patents.*